United States Patent [19]

Northcutt

[11] Patent Number: 5,279,255
[45] Date of Patent: Jan. 18, 1994

[54] HORSE HAIR BANDING DEVICE

[76] Inventor: Wayne E. Northcutt, P.O. Box 1002, Crockett, Tex. 75835

[21] Appl. No.: 61,236

[22] Filed: May 17, 1993

[51] Int. Cl.$^5$ ............................................. A01K 13/00
[52] U.S. Cl. ...................................... 119/83; 132/212
[58] Field of Search ................ 119/83, 85; 66/1A, 3; 289/17; 223/99, 50; 132/212, 270, 271

[56] References Cited

U.S. PATENT DOCUMENTS

| | | | |
|---|---|---|---|
| 2,655,924 | 10/1953 | Petitta | 132/212 |
| 3,295,535 | 1/1967 | Amato | 132/212 |
| 3,603,320 | 9/1971 | Scipione | 132/270 |
| 3,752,517 | 8/1973 | Warmack | 289/17 |
| 4,369,690 | 1/1983 | Sapkus | 132/212 X |

Primary Examiner—Gene Mancene
Assistant Examiner—Thomas Price
Attorney, Agent, or Firm—Harrison & Egbert

[57] ABSTRACT

A banding device for horse hair having a first tubular member with a first end and an inner diameter for receiving horse hair therethrough, a second tubular member slidably positioned on an outer surface of the first tubular member, and an elastic band extending around an outer surface of the first tubular member between the end of the first tubular member and an end of the second tubular member. The second tubular member is slidable such that an end of the second tubular member extends to an end of the first tubular member. The second tubular member has an inner surface in frictional contact with an outer surface of the first tubular member. A hook member is removably received within the inner diameter of the first tubular member and has a hook for engaging horse hair. A plurality of elastic bands extend around the second tubular member. The second tubular member has an annular surface at an end opposite the first end and extends outwardly radially from the outer surface of the second tubular member.

11 Claims, 1 Drawing Sheet 5,279,255

HORSE HAIR BANDING DEVICE

TECHNICAL FIELD

The present invention relates to devices for the banding of horse hair. More particularly, the present invention relates to combs and similar devices used for the organizing of the hair of a horse.

BACKGROUND ART

Virtually all horses have a mane of hair which is formed along the top surface of the horse's neck. This mane of hair is quite prominent in some types of horses and less prominent in other types of horses. The mane of hair is generally a very coarse hair which extends upwardly from the neck of the horse. If the horse's mane is left untended, the mane of hair will generally have a rather unruly appearance. The hair may extend outwardly at awkward angles and may be of uneven length.

There are many events in which the horse's appearance is of a great deal of significance. Particularly, show horse events require that the horse have an excellent appearance and have good grooming. The horse's appearance can also have some significance in some equestrian events and some racing events. In order to properly groom the horse, the horse's mane must be clean, trimmed, and otherwise tended to.

Many owners of show horses consider it desirable to "band" the mane of the horse. The procedure of banding the horse's mane is similar, in concept, to the formation of braids of hair or children ∝ s pigtails. Typically, sections of the horse's mane are tied together or braided together. This can be a very time consuming process. Often, it is difficult to achieve proper uniformity in the banding of the horse's mane. Depending on the accuracy of the person carrying out the banding, the clumps of hair may be generally uneven.

The procedure for the banding of a horse's mane is made even more complicated by the fact that the horse can become impatient and will move around. This makes it difficult to take the necessary steps so as to make sure that the mane is banded in a proper manner.

One product that has appeared on the market has been used for the banding of horse hair. This product is known as a "PERFECT BAND (TM)". The product is presently sold by Perfect Band, Inc. of Townsend, Mass. This device utilizes a tubular member having a slot extending longitudinally through the tubular member. A handle is formed on the tubular member so as to allow the user to properly maintain the member in a proper position. The hair of the horse is placed through the slot formed in the tube. Bands may then be applied to the hair extending outwardly from the other end of the slot. This device utilizes a tough latex band that requires no twisting and lays flat against the base of the mane. In normal use, this is a complicated procedure which makes it difficult to quickly band the mane of the horse. Another product which is on the market is a horse hair banding comb that is presently being sold by Northcutt Enterprises of Crockett, Tex. This product is the subject of U.S. patent Application Ser. No. 08/005,133, filed on Jan. 15, 1993, to the present inventor, and entitled "Horse Hair Banding Comb". This product is a banding comb having a comb member with a plurality of teeth and a plurality of receptacles formed therein. A locking member is removably affixed to the comb member. The locking member extends over the teeth. The locking member has an edge positioned in proximity to the receptacle area. The receptacle area allows horse hair to pass therethrough. The comb member is made up of a body, a first tooth having a V-shaped configuration and extending downwardly from the body, a second tooth having a V-shaped configuration and extending downwardly from the body, and a first receptacle area formed in the body between the first and second teeth. The locking member includes a first bar and a second bar in generally parallel spaced relationship. The comb member is positioned within this spaced area between the first and second bars. The use of the "BAND-IT (TM)" comb allows the horse hair to be properly organized into equal sized groupings of hair. Once the hair is organized in this fashion, a rubber band is placed around the hair which extends outwardly of the comb. The rubber band can then be twisted so as to group the hair in a neatly organized fashion.

One of the problems with the "BAND-IT (TM)" comb is the fact that it still requires that the user place the rubber band in a proper position around the clumps of hair. Often, the manipulation of the rubber band is quite a complicated process. This is especially true where the horse is moving his head around during the banding process. Many people find that the affixing of the rubber band in a proper position around the clumps of hair is an extremely time consuming process. As a result, a need has developed which allows the user to apply the rubber band in an expeditious manner.

It is an object of the present invention to provide a banding device that expedites the process of banding a horse's hair.

It is another object of the present invention to provide a banding device that allows the user to place a rubber band in a proper position around grouped portions of horse hair.

It is still a further object of the present invention to provide a banding device that is relatively inexpensive, easy to manufacture, and easy to use.

These and other objects and advantages of the present invention will become apparent from a reading of the attached specification and appended claims.

SUMMARY OF THE INVENTION

The present invention is a banding device comprising a first tubular member having a first end and having an inner diameter for receiving horse hair therethrough, a second tubular member slidably positioned on an outer surface of the first tubular member, and an elastic band extending around an outer surface of the first tubular member between the end of the first tubular member and the first end of the second tubular member. The second tubular member is slidable such that a first end of the second tubular member extends to the end of the first tubular member for the purpose of pushing the elastic band from the first tubular member.

The first tubular member has a greater length than the second tubular member. The second tubular member has an inner surface in frictional contact with the outer surface of the first tubular member. The second tubular member has an annular surface at an end opposite the first end. The annular surface extends outwardly radially from the outer surface of the second tubular member. This annular surface has a discoidal appearance and having a diameter greater than the second tubular member. The annular member has an inner diameter equal to an inner diameter of the second tubular member.

The second tubular member is movable between a first position distal the first end of the first tubular member and a second position in which the first end of the second tubular member is aligned with the end of the first tubular member.

The elastic band has an unexpanded diameter less than a diameter of the first tubular member. A plurality of elastic bands extend around the second tubular member between the first end and the annular surface.

A hook member is removably received within the inner diameter of the first tubular member. The hook member has a hook at one end. The hook serves to engage the horse hair. The hook extends outwardly of the end of the first tubular member. The hook member has an opposite end extending outwardly of an opposite end of the first tubular member. The hook has a width less than the inner diameter of the first tubular member.

The present invention is also a method of banding horse hair comprising the steps of: (1) positioning a banding device in proximity to the horse hair; (2) pulling the horse hair through the inner diameter of the first tubular member of the banding device such that an end of the horse hair extends outwardly of an end of the first tubular member; (3) pushing the elastic band toward an opposite end of the first tubular member until the elastic band extends around the horse hair; and (4) removing the banding device from the horse hair.

The step of pushing includes pushing the second tubular member toward the opposite end of the first tubular member such that the end of the second tubular member pushes the elastic band off of an opposite end of the first tubular member. The step of pulling the horse hair includes the steps of (1) extending a hook member into the inner diameter of the first tubular member such that a hook of the hook member extends outwardly of an opposite end of the first tubular member; (2) grasping the horse hair with the hook; and (3) pulling the horse hair through the first tubular member until the end of the horse hair extends outwardly of the end of the first tubular member. The horse hair can then be grasped such that the horse hair can be pulled while the elastic band is pushed toward the opposite end of the first tubular member.

The method of the present invention also includes the step of affixing an elastic band around an outer surface of the first tubular member. A plurality of elastic bands are placed around an outer diameter of the second tubular member. After the elastic band has been placed on the horse hair, one of the plurality of elastic bands is pushed from the second tubular member onto the outer surface of the first tubular member.

DETAILED DESCRIPTION OF THE INVENTION

Figure 1:
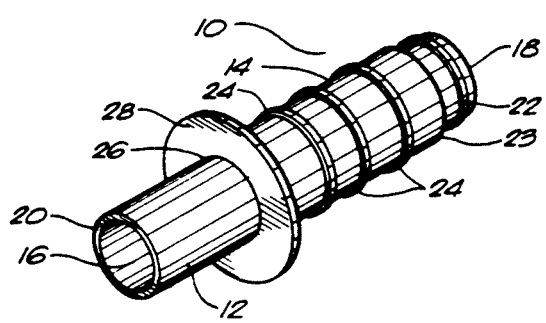
FIG. 1 is a perspective view of the banding device of the present invention.

Referring to FIG. 1, there is shown at 10 the banding device in accordance with the preferred embodiment of the present invention. The banding device 10 includes a first tubular member 12 and a second tubular member 14. The first tubular member 12 has an inner diameter 16 extending therethrough. The first tubular member 12 has a first end 18 and a second end 20. The second tubular member 14 is slidably positioned on an outer surface of the first tubular member 12. An elastic band 22 extends around an outer surface of the first tubular member 12 between a first end 23 of the second tubular member 14 and the first end 18 of the first tubular member 12. A plurality of elastic bands 24 are positioned so as to extend around the outer diameter of the second tubular member 14.

As can be seen in FIG. 1, the second tubular member 14 is positioned between the ends 18 and 20 of the first tubular member 12. The second tubular member 14 has an inner diameter 26 which is in frictional contact with the outer surface of the first tubular member 12. The second tubular member 14 is configured so as to slide along the first tubular member 12 from the position shown in FIG. 1 to a position in which the second tubular member 14 is aligned with the end 18 of the first tubular member 12. The second tubular member 14 has an annular surface 28 positioned at an end opposite the first end 23. As can be seen, this annular surface 28 extends outwardly radially from the outer surface of the second tubular member 14. In general, the annular surface 28 has a discoidal appearance. The annular surface 28 has a diameter greater than that of the second tubular member 14. The annular surface 28 has an inner diameter generally corresponding with the inner diameter 26 of the second tubular member 14.

The elastic band 22 extends around the outer surface of the first tubular member 12 between the first end 18 of the first tubular member 12 and the end 23 of the second tubular member 14. This elastic band 22 can be a rubber band having an unexpanded diameter less than the diameter of the first tubular member. The plurality of elastic bands 24, extending around the outer surface of the second tubular member 14, similarly have an unexpanded diameter less than the diameter of the first tubular member 14. The elastic bands 24 have a configuration similar to the elastic band 22.

Figure 2:
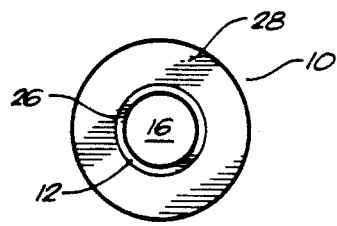
FIG. 2 is a left side end view of the banding device of the present invention.

FIG. 2 shows an end view of the banding device 10. It can be seen that the first tubular member 12 extends centrally through the second tubular member 14. The annular surface 28 extends outwardly therefrom. The annular surface 28 serves to retain elastic bands on the surface of the second tubular member 14 and to prevent such bands from passing onto the surface of the first tubular member 12 rearward of the second tubular member 14. The first tubular member 12 has an inner diameter 16 which allows horse hair to pass therethrough. The outer surface of the first tubular member 12 is in frictional contact with the inner surface 26 of the second tubular member 14.

Figure 3:
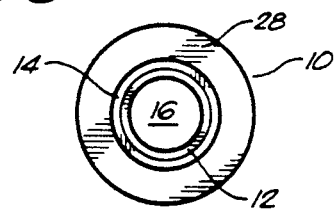
FIG. 3 is right side end view of the banding device of the present invention.

FIG. 3 is a view from the first end 18 of the banding device 10. It can be seen that the first tubular member 12 extends inwardly of the second tubular member 14. The inner diameter 16 extends through the first tubular member so as to allow horse hair to pass therethrough. The annular surface 28 has a greater diameter than the second tubular member 14. Although not shown, the elastic band 22 will extend around the outer diameter of the first tubular member 12. Similarly, a plurality of elastic bands 24 will extend around the exterior surface of the second tubular member 14.

Figure 4:
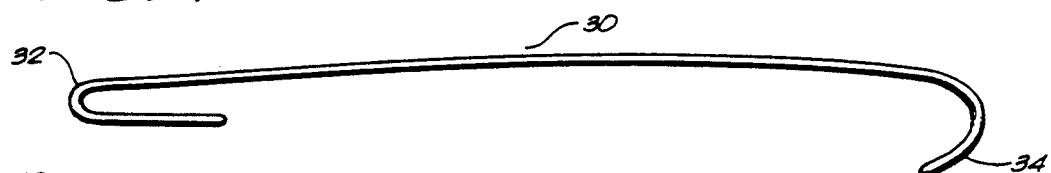
FIG. 4 is a side elevational view of the hook member of the present invention.

The present invention includes a hook member 30. Hook member 30, as illustrated in FIG. 4, is a rigid member having a hook 32 formed at one end. The hook member 30 is removably received within the inner diameter 16 of the first tubular member 12. The hook 32 serves to engage the horse hair for the purpose of pulling horse hair through the inner diameter 16 of the first tubular member 12. The hook member 30 has an opposite end 34 which has a width greater than the inner diameter 16 of the first tubular member 12. The hook 32 has a width less than the inner diameter 16 of the first tubular member 12. This allows the hook 32 to be properly inserted into and through the inner diameter 16 of the first tubular member 12. The widened opposite end 34 will serve to prevent the hook member 32 from passing entirely through the banding device 10.

Figure 5A:
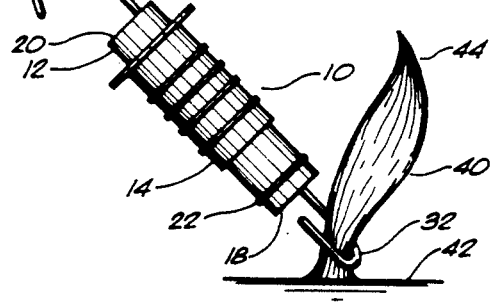
FIGS. 5A-5D show the sequential steps of the method of the present invention.

Referring to FIG. 5A, it can be seen that the horse hair banding device 10 is placed into close proximity with the horse hair 40. Specifically, the horse hair banding device 10 includes a first tubular member 12 and a second tubular member 14. An elastic band 22 is placed around the outer surface of the first tubular member 12 adjacent to the end 18 of the first tubular member 12.

The horse hair 40 is shown as extending upwardly from the horse 42. Initially, a hook member 30 is inserted through the inner diameter 16 of the first tubular member 12 such that the hook end 32 of the hook member 30 will extend outwardly of the end 18 of the first tubular member 12. The hook end 32 is shaped and configured so as to grasp a section of horse hair. Specifically, the hook end 32 will extend around the horse hair 40. The hook member 30 is then pulled rearwardly so as to pull the hook end 32 into the end 18 of the first tubular member 12. This will cause the horse hair 40 to be pulled into the first tubular member 12 such that the ends 44 will extend outwardly from the ends 20 of the first tubular member 12.

Figure 5B:
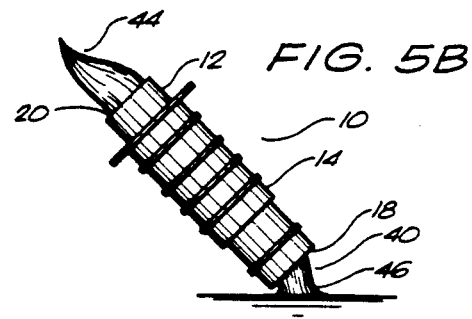

FIG. 5B shows that the horse hair 40 has entered the end 18 of the first tubular member 12 and has passed through the interior of the first tubular member 12. The ends 44 of the horse hair 40 extend outwardly from the end 20 of the first tubular member 12. In this position, the horse hair 40 is neatly organized into a proper grouping. The initial organization of the horse hair 40 can be accomplished by the use of various devices on the market, such as the "BAND-IT (TM)" comb. Normally, such a comb can be used so as to organize the hair into a grouping. The hook member 30 is employed so as to draw this grouping of horse hair 40 into the interior of the banding device 10. After the horse hair 40 has assumed the position shown in FIG. 5B, it is then important to place a rubber band around the horse hair 40 near the roots 46 of the horse hair 40.

Figure 5C:
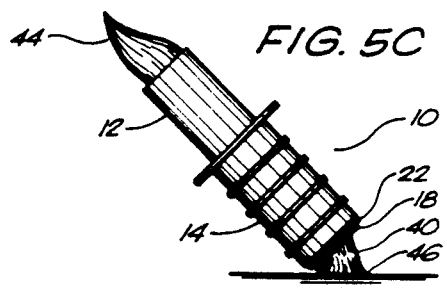

FIG. 5C illustrates how the present invention is configured so as to properly position a rubber band around the horse hair 40. As can be seen in FIG. 5C, the second tubular member 14 is pushed toward the end 18 of the first tubular member 12. Given the close frictional relationship of the inner diameter of the second tubular member 14 and the outer surface of the first tubular member 12, the second tubular member 14 will serve to push the elastic band 22 off of the end 18 of the first tubular member 12. Once the elastic band 22 has been pushed off of the end 18 of the first tubular member 12, it will reside in proximity to the roots 46 of horse hair 40.

Figure 5D:
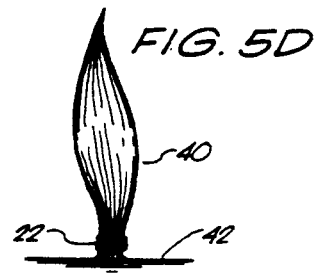

It can be seen in FIG. 5D that the elastic band 22 has been placed adjacent to the bottom of the horse hair 40 adjacent to the horse 42. As can be seen, the horse hair 40 is then properly arranged into a neat and organized grouping.

After the task has been accomplished in the manner shown in FIGS. 5A-D, the banding device 10 is removed from the horse hair 10. After the banding device 10 has been removed, the elastic bands 24, extending around the outer surface of the second tubular member 14 can be rolled off of the end 23 of the second tubular member so as to reside in the position of the elastic band 22, shown in FIG. 1. As such, the banding device 10 is properly configured so as to carry out the next step of banding.

The banding device 10 of the present invention is configured for the quick and easy banding of horse hair. In combination with hook members for the grouping of horse hair, the banding device 10 of the present invention allows bands to be placed around the small groupings of horse hair. This allows the horse's mane to be neatly organized in an attractive and aesthetically pleasing manner. The banding device 10 operates to speed up the operation of banding. The simple arrangement of the present invention allows the horse's mane to be easily banded by unskilled persons. The present invention only requires a simple manipulation of the hair, the hook member 30, and the banding device 10 so as to accomplish the purpose of banding the horse's mane.

The foregoing disclosure and description of the invention is illustrative and explanatory thereof. Various changes in the details of the illustrated construction, or in the steps of the described method, can be made within the scope of the appended claims without departing from the true spirit of the invention. The present invention should only be limited by the following claims and their legal equivalents.

I claim:

1. A banding device for horse hair comprising:
   a first tubular member having an end, said first tubular member having an inner diameter for receiving horse hair therethrough;
   a second tubular member slidably positioned on an outer surface of said first tubular member, said second tubular member slidable such that a first end of said second tubular member extends to said end of said first tubular member; and
   an elastic band extending around an outer surface of said first tubular member between said end of said first tubular member and said first end of said second tubular member.

2. The banding device of claim 1, said first tubular member having a greater length than said second tubular member.

3. The banding device of claim 1 said second tubular member having an inner surface in frictional contact with said outer surface of said first tubular member.

4. The banding device of claim 1, said second tubular member having an annular surface at an end opposite said first end, said annular surface extending outwardly radially from said outer surface.

5. The banding device of claim 4, said annular surface being discoidal with a diameter greater than said first tubular member, said annular surface having an inner diameter equal to an inner diameter of said second tubular member.

6. The banding device of claim 1, said second tubular member movable between a first position distal said end of said first tubular member and a second position in which said first end of said second tubular member is adjacent said end of said first tubular member.

7. The banding device of claim 1, said elastic band having an unexpanded diameter less than a diameter of said first tubular member.

8. The banding device of claim 1, further comprising:
a hook member having a hook at one end, said hook member removably received within said inner diameter of said first tubular member, said hook for engaging the horse hair.

9. The banding device of claim 8, said hook extending outwardly of said end of said first tubular member, said hook member having an opposite end extending outwardly of an opposite end of said first tubular member.

10. The banding device of claim 9, said hook having a width less than an inner diameter of said first tubular member.

11. The banding device of claim 4, further comprising:
a plurality of elastic bands extending around said second tubular member between said first end and said annular surface.

* * * * *